No. 692,487. Patented Feb. 4, 1902.
T. SHURMER.
WOODWORKING MACHINE.
(Application filed July 21, 1899.)
(No Model.) 5 Sheets—Sheet 3.
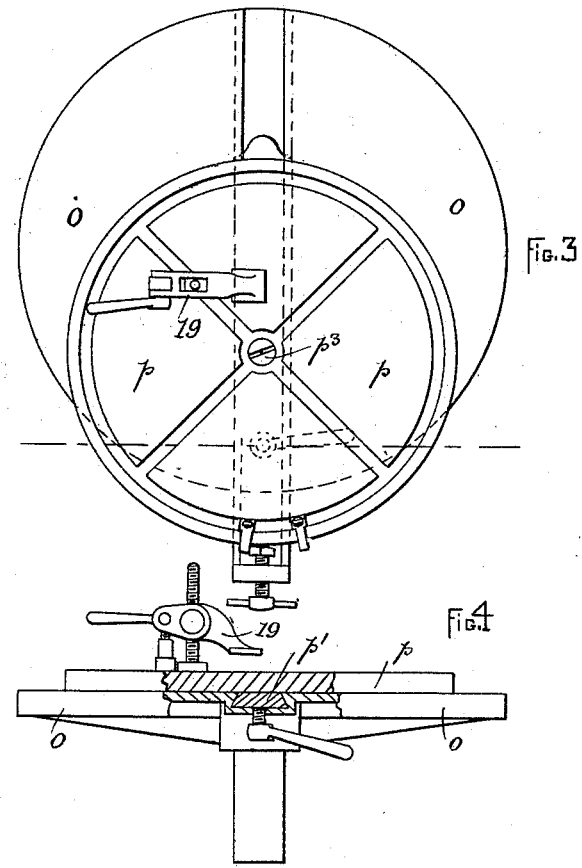
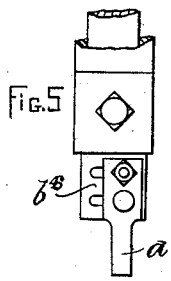
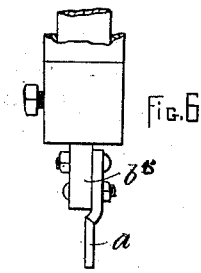
Witnesses
Inventor
Thomas Shurmer
Attorneys No. 692,487. Patented Feb. 4, 1902.
T. SHURMER.
WOODWORKING MACHINE.
(Application filed July 21, 1899.)
(No Model.) 5 Sheets—Sheet 4.
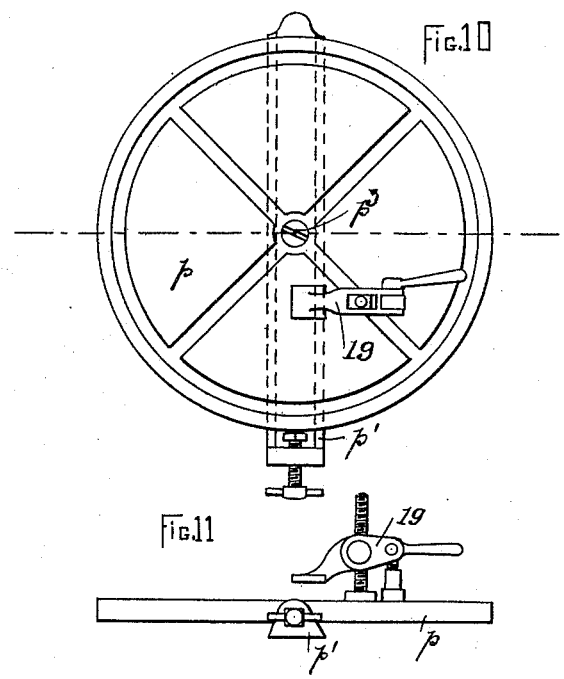
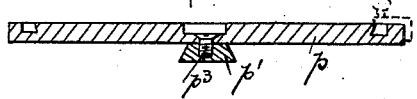
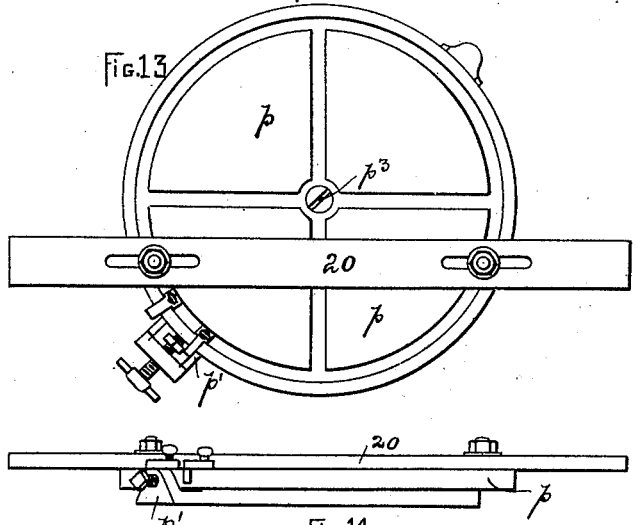

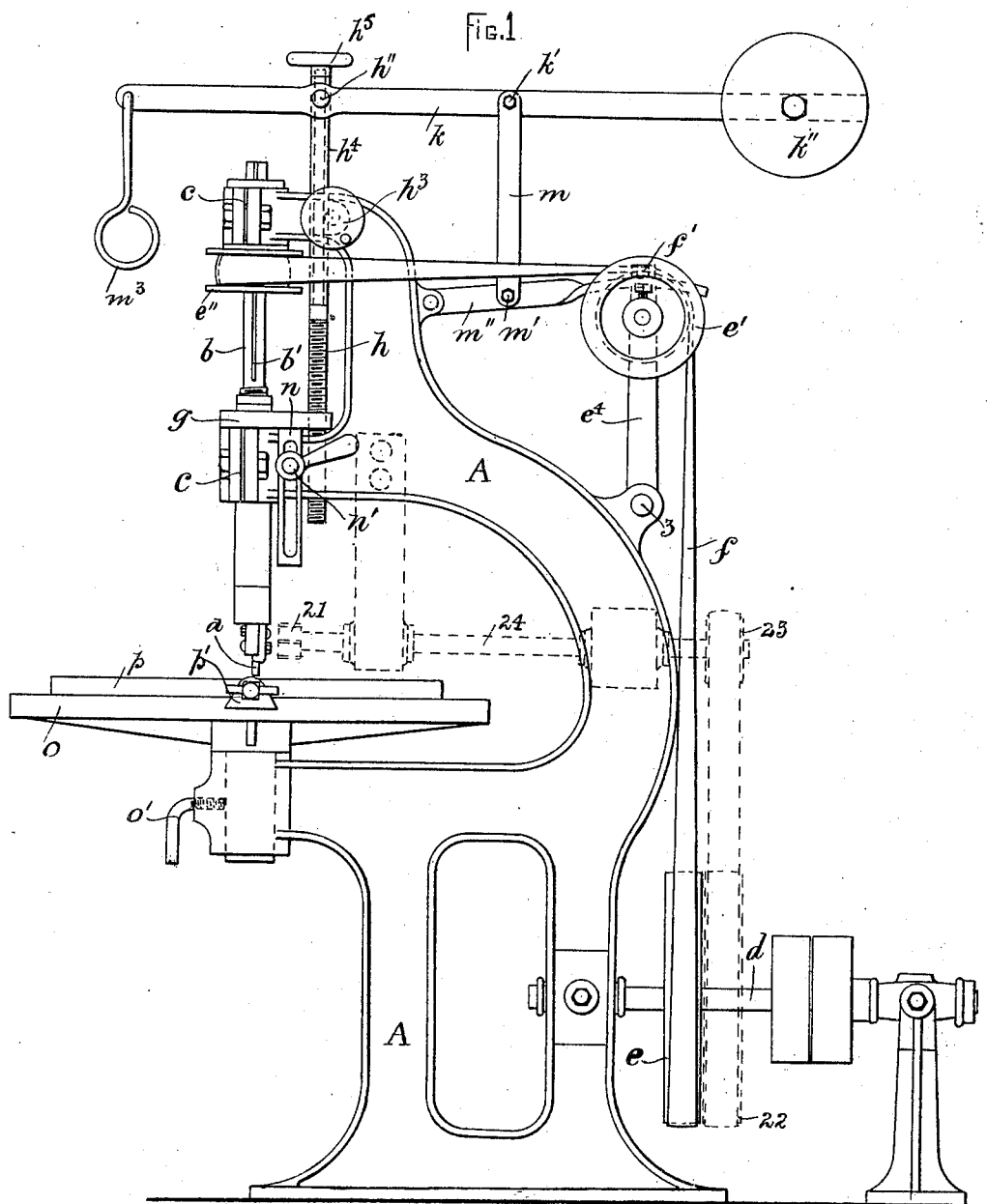

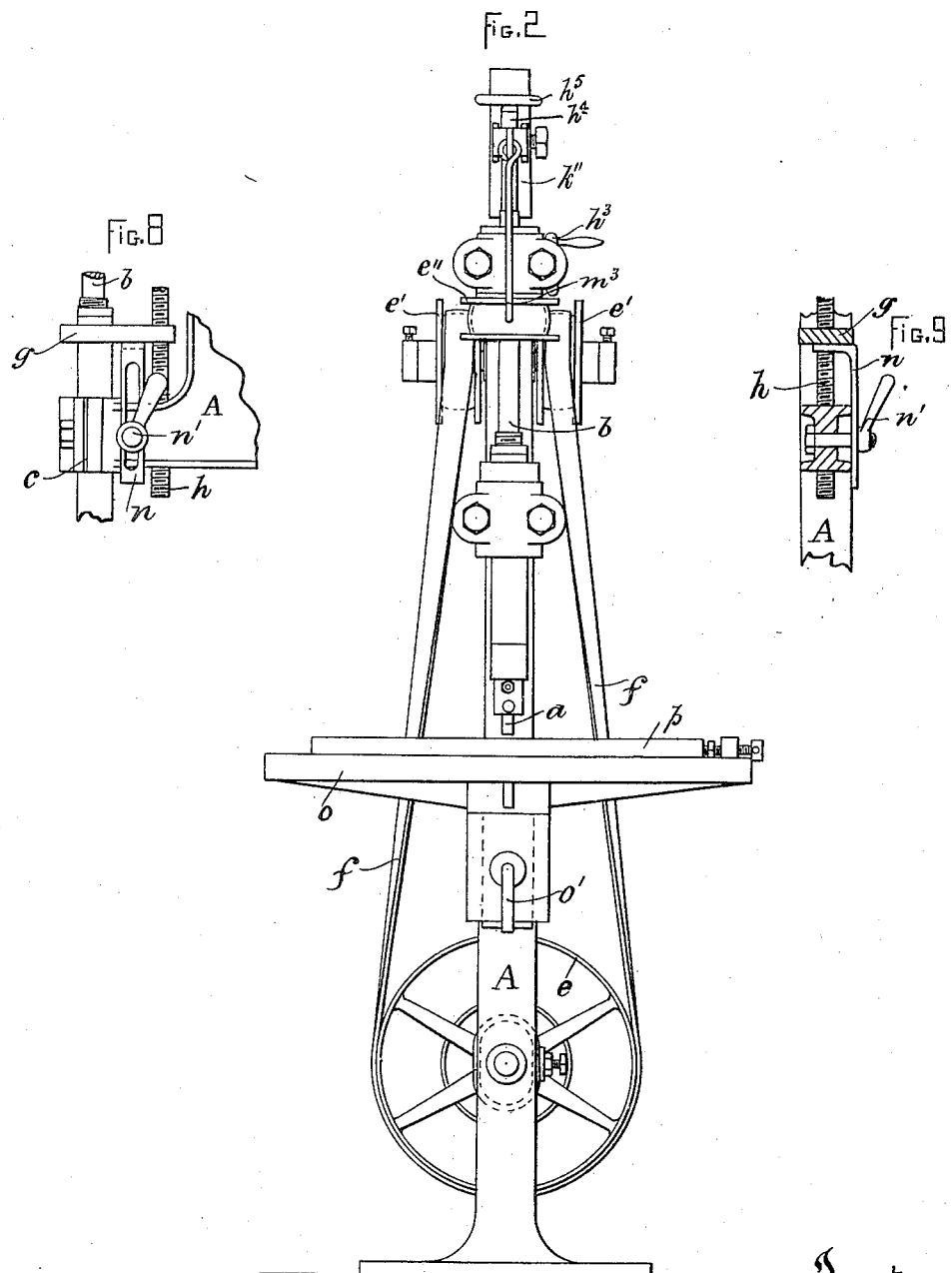

No. 692,487. Patented Feb. 4, 1902.
T. SHURMER.
WOODWORKING MACHINE.
(Application filed July 21, 1899.)
(No Model.) 5 Sheets—Sheet 5.
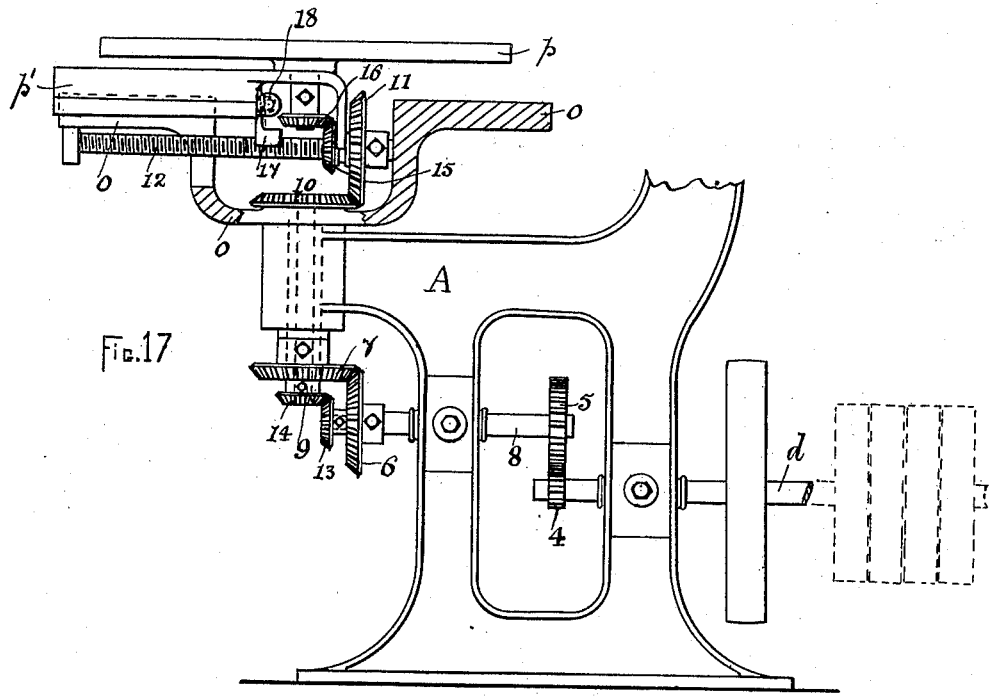
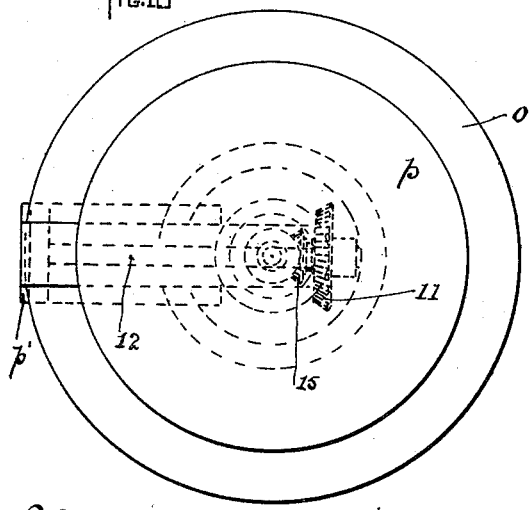
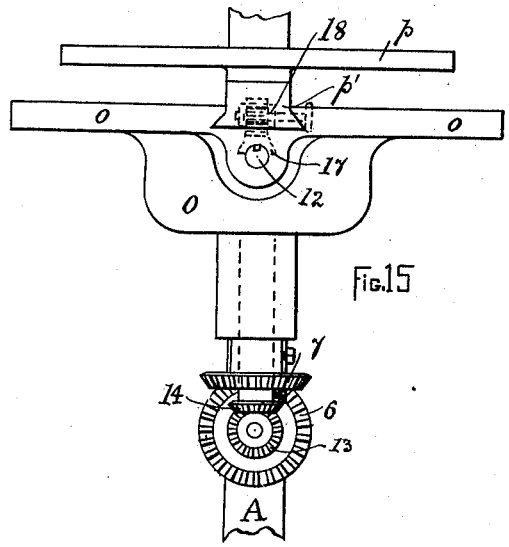
Witnesses
E. Batchelder
N. W. Harrison
Inventor
Thomas Shurmer
by Wright, Brown & Quinby
Attorneys

UNITED STATES PATENT OFFICE.

THOMAS SHURMER, OF BOLTON, ENGLAND.

WOODWORKING-MACHINE.

SPECIFICATION forming part of Letters Patent No. 692,487, dated February 4, 1902.

Application filed July 21, 1899. Serial No. 724,692. (No model.)

*To all whom it may concern:*

Be it known that I, THOMAS SHURMER, a subject of the Queen of Great Britain, and a resident of 306 Manchester road, Bolton, in the county of Lancaster, England, have invented a certain new and useful Woodworking-Machine, of which the following description, together with the accompanying sheets of drawings, is a specification.

The object of this invention is the production of comparatively inexpensive mechanism that may be employed for cutting, trenching, or grooving wood, as is necessary for forming circular or curved molds, grooving the sides or cheeks for staircases, and other operations of a similar nature and that in an expeditious and efficient manner. To attain this object, I make use of the devices hereinafter described, the same being illustrated by the accompanying sheets of drawings, in which—

Figure 1 is a side elevation of the machine. Fig. 2 is a front view of said machine. Fig. 3 is a plan of the tables and parts of said machine. Fig. 4 is a part-sectional elevation of said tables. Figs. 5, 6, and 7 are front and side elevation and sectional plan, respectively, of one of the forms of cutters which I make use of. Figs. 8 and 9 are side and sectional elevations of parts in detail, illustrating how the height of the cutter may be regulated. Figs. 10, 11, and 12 are plan, elevation, and sectional elevation, respectively, showing one of the movable tables and its several parts in detail. Figs. 13 and 14 are plan and elevation of a modified form of attachment for the table shown by Fig. 10. Figs. 15, 16, and 17 are elevation, plan, and sectional view illustrating means whereby the movements of the table are automatically performed.

Like letters and figures of reference indicate like parts throughout the several views.

A indicates the framework of the machine.

In accordance with my invention I arrange a cutter $a$ so that its operating-spindle $b$ may slide vertically in its bearings $c\ c$ to advance toward or recede from its work, as hereinafter described, its rotary motion being derived from the prime motor-shaft $d$, through the pulleys $e\ e'\ e''$ and the belt $f$, the spindle $b$ carrying a feather or keyway $b'$, so that although free to slide through the pulley $e''$ it may be rotated by it. The spindle $b$ passes through the coupling-piece $g$, to which the screw $h$ is secured, in order that said screw $h$ may act as a connecting-rod to couple the lever $k$ to the spindle $b$. The lever $k$ is pivoted at $k'$ to the arm $m$, hinged at $m'$ to the holding-arm $m''$, so that the operative may move the cutter $a$ vertically by means of the handle $m^3$, the counterbalancing-weight $k''$ assisting him in his operations, while the holding-arm $m''$ allows the guide-pulleys $e'$ to be carried by their supporting-arms $e^4$ (pivoted at 3) to any position that the tension of the driving-belt $f$ may necessitate, a screw $f'$ securing same in position.

When the cutter $a$ has to operate only to a given depth, its descent may be arrested by the adjustable arrester $n$, secured to the framework A by the hand-screw $n'$, (see also Figs. 8 and 9,) the screw $h$ being to enable the adjustment of the piece $g$ relatively with the pivotal centers $h''$ and $k'$, while when the cutter $a$ has to operate in a fixed plane then the sleeve $h^4$ is locked in position by the hand-screw $h^3$, in which case the lever $k$ ceases to be used, and, if desired, the part $g$ may be raised or lowered by turning the screw $h$ by means of the hand-wheel $h^5$.

Beneath the cutter $a$ I mount a table $o$, which I arrange so that it may be revolved upon the framework A when desired or which when not required to move may be secured rigidly thereto by the screw $o'$. When this table $o$ has to rotate, its motion may be effected manually by the operative, in which case its simple bearings (shown by Figs. 1 and 2) are employed, or motion may be transmitted to it from the shaft $d$, gearing-wheels 4, 5, 6, and 7, and shaft 8, as shown by Fig. 17. Upon the table $o$ I mount another table $p$, which I arrange by its dovetailed strip $p'$ to slide over the table $o$ by taking into a groove made in the table $o$ to receive same, as well as to rotate upon said strip $p'$ about the pivotal pin $p^3$. The sliding movements of this table $p$, as well as its rotary motion, may also be performed manually by the operative, in which case their simple mountings (shown by Figs. 1, 2, 3, and 4) may be made use of, or by arranging the shaft 9 (see Figs. 15, 16, and 17) to extend centrally through the table $o$ and carry a gear-wheel 10, meshing with a wheel 11, secured to a screwed shaft 12, pivotally mounted to said table o, rotary motion may be transmitted from the shaft 8 through the gears 13 and 14 to said shaft 12, from which rotary motion when desired may be transmitted to the table p by the gears 15 and 16. However, as the shaft 12 is a screwed shaft (and the wheel 15 moves along it on a keyway or feather) when the half-nut 17, mounted in the bearings 18, secured to the slide p', is put into gear with it said screw 12 will transmit the sliding movement to said table p, as desired. Clutch-coupling devices or ordinary set-screws may be employed for securing the wheels 6 and 15 to their respective motors or releasing same therefrom when one or the other is or is not desired to be employed. The arrangement of gearing is such as to enable the tables o and p to be rotated separately or together and also that the table p may be automatically fed along its groove on the table o when desired. The gear 6 is mounted on the shaft 8 and gears with the wheel 7, fixed on a hollow shaft surrounding the shaft 9, the upper end of said hollow shaft being rigidly connected to the central depressed portion of the table o. By this means said table o is rotated. By forming the wheel 6 so that it may be readily disconnected from its shaft, so as to be loose thereon, the table o may be rotated by hand as and whenever desired.

The table p is rotated from the shaft 8 by the following means: The gear 13, mounted on said shaft 8, drives the gear 14, mounted on the lower end of the shaft 9, having the wheel 10 at its upper end. Said wheel 10 meshes with the wheel 11, mounted on and driving the screw-shaft 12. The wheel 15 is mounted on the shaft 12 and is connected thereto by means of a spline or feather, so that said wheel 15 may always be positively driven by the shaft 12, while said shaft 12 is free to move longitudinally through said wheel 15. Said wheel 15 is held in engagement with the wheel 16 and is prevented from moving along its axis with the shaft 12 by means of a bracket extending from the table p', as shown in Fig. 17, and engaging a groove in the hub of said wheel 15. Since the wheel 15 gears with the wheel 16 on the shaft of the table p, the latter is rotated by it. The half-nut 17, carried by the projection on the slide p' of the table, may be moved and held in or out of gear with the shaft 12 by any suitable means. When said half-nut rests upon the screw-shaft 12, the slide p' of the table p is moved along its groove in the table o automatically. By forming the wheel 16 so that it may be disconnected from the shaft, so as to be loose thereon, the table p may be rotated by hand as and whenever necessary. By applying any well-known reversing motion to the shaft d, such as indicated by the arrangement of pulleys shown in dotted lines in Fig. 17, the several movements may be transmitted in either direction.

From the foregoing it will be seen that when a piece of wood is secured to the table p (by the clamping device 19 or by any other means) it may be subjected to the actions of the cutter a and guided or moved in many and varied paths relatively therewith to be treated as may be desired.

The cutter a is preferably made, when for plain work, of curved form, (shown by the sectional drawing, Fig. 7,) and its attachment to the spindle b is preferably by the slotted part $b^6$, so that adjustment to compensate for wear through usage may be effected as well as adjustment to enable the cutter a to be taken by its said spindle b through a greater path of motion.

For producing molds on circular parts, as well as straight pieces, the form of the cutter a is made of a corresponding shape, as is well understood, while for passing long articles to be treated by said cutter a over the top of the table p I may use a guide piece or fence 20, as shown by Figs. 13 and 14.

If desired, a cutter 21, arranged to rotate in the vertical plane, as shown in broken lines, Fig. 1, may be made use of when found desirable, since its rotary motion may be readily derived from the shaft d through the pulleys 22 and 23 and the shaft 24.

Such being the nature and object of my invention, what I claim is—

A woodworking-machine comprising in its construction a work-supporting table, a vertically-movable spindle carrying a cutter at its lower end, means for rotating said spindle, a controlling-lever, an adjustable connection between said lever and the spindle whereby the vertical movement of the spindle may be controlled, and means for locking the said connection for preventing vertical movement of the spindle and the cutter.

In testimony whereof I have affixed my signature in the presence of two witnesses.

THOMAS SHURMER.

Witnesses:
 SAMUEL HEY,
 DAN DUTTON.